(12) United States Patent
Willis et al.

(10) Patent No.: US 7,437,199 B2
(45) Date of Patent: Oct. 14, 2008

(54) METHOD FOR DATA PRE-POPULATION

(75) Inventors: James E Willis, Austin, TX (US);
Satoshi Harada, Nirasaki (JP); Edward C Hume, III, Austin, TX (US); James E Klekotka, Mesa, AZ (US)

(73) Assignee: Tokyo Electron Limited (JP)

( * ) Notice: Subject to any disclaimer, the term of this patent is extended or adjusted under 35 U.S.C. 154(b) by 103 days.

(21) Appl. No.: 10/854,424

(22) Filed: May 27, 2004

(65) Prior Publication Data

US 2004/0243256 A1    Dec. 2, 2004

Related U.S. Application Data

(60) Provisional application No. 60/474,226, filed on May 30, 2003.

(51) Int. Cl.
*G05B 11/01* (2006.01)
*G05B 9/02* (2006.01)

(52) U.S. Cl. .............. 700/21; 700/79; 700/80
(58) Field of Classification Search ......... 700/79, 700/21, 80, 121; 717/104; 714/53
See application file for complete search history.

(56) References Cited

U.S. PATENT DOCUMENTS

| | | | |
|---|---|---|---|
| 5,859,964 A * | 1/1999 | Wang et al. ............... 714/48 |
| 6,438,440 B1 * | 8/2002 | Hayashi .................. 700/121 |
| 6,480,854 B1 * | 11/2002 | Gross et al. ............... 707/10 |
| 6,633,831 B2 * | 10/2003 | Nikoonahad et al. ....... 702/155 |
| 6,665,576 B2 * | 12/2003 | Hayashi .................. 700/121 |
| 6,673,637 B2 * | 1/2004 | Wack et al. ............... 438/14 |
| 6,694,284 B1 * | 2/2004 | Nikoonahad et al. ....... 702/155 |
| 6,708,075 B2 * | 3/2004 | Sonderman et al. ........ 700/121 |
| 6,773,931 B2 * | 8/2004 | Pasadyn et al. ............ 438/10 |
| 6,782,337 B2 * | 8/2004 | Wack et al. ............... 702/155 |
| 6,790,680 B1 * | 9/2004 | Grover et al. ............... 438/5 |
| 6,806,951 B2 * | 10/2004 | Wack et al. ............. 356/237.2 |
| 6,812,045 B1 * | 11/2004 | Nikoonahad et al. ......... 438/14 |
| 6,836,691 B1 * | 12/2004 | Stirton ..................... 700/108 |

(Continued)

OTHER PUBLICATIONS

Advance Process Control solutions for semiconductor manufacturing Sarfaty, M.; Shanmugasundram, A.; Schwarm, A.; Paik, J.; Jimin Zhang; Rong Pan; Seamons, M.J.; Li, H.; Hung, R.; Parikh, S.;Advanced Semiconductor Manufacturing 2002 IEEE/SEMI Conference and Workshop Apr. 30-May 2, 2002 pp. 101-106 Digital Object Identifier 10.1109/ASMC.2002.*

(Continued)

*Primary Examiner*—Michael B. Holmes

(57) ABSTRACT

A method of using an APC system to perform a data pre-population function is described in which the APC system is coupled to a processing element. The APC system comprises an APC computer including operational software, a database coupled to the APC computer, and a GUI, and the processing element comprises at least one of a tool, a processing module, and a sensor. When the APC system operates, the APC system collects data from the processing element and stores the collected data in the database. When an APC malfunction occurs, a data recovery (data pre-population) can be performed. When some of the historical data is missing, a data recovery (data pre-population) can be performed. When an APC system is coupled to a new tool having some historical data, a data recovery (data pre-population) can be performed.

33 Claims, 4 Drawing Sheets

U.S. PATENT DOCUMENTS

| | | | | |
|---|---|---|---|---|
| 6,910,947 | B2* | 6/2005 | Paik | 451/21 |
| 6,915,173 | B2* | 7/2005 | Chan et al. | 700/44 |
| 6,934,931 | B2* | 8/2005 | Plumer et al. | 717/104 |
| 6,950,716 | B2* | 9/2005 | Ward et al. | 700/121 |
| 6,952,656 | B1* | 10/2005 | Cordova et al. | 702/117 |
| 6,986,698 | B1* | 1/2006 | Molnar | 451/5 |
| 6,991,945 | B1* | 1/2006 | Castle et al. | 438/14 |
| 7,051,250 | B1* | 5/2006 | Allen et al. | 714/708 |
| 7,076,318 | B2* | 7/2006 | Hayashi | 700/121 |
| 7,082,345 | B2* | 7/2006 | Shanmugasundram et al. | 700/121 |
| 7,089,075 | B2* | 8/2006 | Hasan | 700/121 |
| 7,113,838 | B2* | 9/2006 | Funk et al. | 700/121 |
| 7,123,980 | B2* | 10/2006 | Funk et al. | 700/121 |
| 7,153,709 | B1* | 12/2006 | Purdy et al. | 438/4 |
| 7,194,325 | B2* | 3/2007 | Lee et al. | 700/108 |
| 7,198,546 | B2* | 4/2007 | Berman et al. | 451/8 |
| 2001/0032025 | A1 | 10/2001 | Lenz et al. | |
| 2005/0047645 | A1* | 3/2005 | Funk et al. | 382/145 |

OTHER PUBLICATIONS

Virtual metrology: a solution for wafer to wafer advanced process control PingHsu Chen; Wu, S.; Junshien Lin; Ko, F.; Lo, H.; Wang, J.; Yu, C.H.; Liang, M.S.; Semiconductor Manufacturing, 2005. ISSM 2005, IEEE International Symposium on Sep. 13-15, 2005 pp. 155-157 Digital Object Identifier 10.1109/ISSM.2005. 1513322.*

Advanced process control based on lithographic defect inspection and reduction Leavey, J.; Boyle, J.; Skumanich, A.; Advanced Semiconductor Manufacturing Conference and Workshop, 2000 IEEE/SEMI Sep. 12-14, 2000 pp. 33-40 Digital Object Identifier 10.1109/ASMC.2000.902555.*

An Approach for Factory-Wide Control Utilizing Virtual Metrology Khan, A. A.; Moyne, J. R.; Tilbury, D. M.; Semiconductor Manufacturing, IEEE Transactions on vol. 20, Issue 4, Nov. 2007 pp. 364-375 Digital Object Identifier 10.1109/TSM.2007.907609.*

Implementation Considerations of Various Virtual Metrology Algorithms Su, Yu-Chuan; Lin, Tung-Ho; Cheng, Fan-Tien; Wu, Wei-Ming; Automation Science and Engineering, 2007. CASE 2007. IEEE International Conference on Sep. 22-25, 2007 pp. 276-281 Digital Object Identifier 10.1109/COASE.2007.4341740.*

Advanced analysis of dynamic neural control advisories for process optimization and parts maintenance Card, J.P.; Chan, W.T.; Cao, A.; Martin, W.; Morgan, J.; Advanced Semiconductor Manufacturing Conference and Workshop, 2003 IEEEI/SEMI Mar. 31-Apr. 1, 2003 pp. 315-321.*

Advanced process control of a CVD tungsten reactor Stefani, J.A.; Poarch, S.; Saxena, S.; Mozumder, P.K.; Semiconductor Manufacturing, IEEE Transactions on vol. 9, Issue 3, Aug. 1996 pp. 366-383 Digital Object Identifier 10.1109/66.536109.*

Run by run advanced process control of metal sputter deposition Smith, T.H.; Boning, D.S.; Stefani, J.; Butler, S.W.; Semiconductor Manufacturing, IEEE Transactions on vol. 11, Issue 2, May 1998 pp. 276-284 Digital Object Identifier 10.1109/66.670176.*

Temperature control and in-situ fault detection of wafer warpage Ho, W.K.; Yap, C.; Tay, A.; Chen, W.; K.W.; Industrial Electronics Society, 2004. IECON 2004. 30th Annual Conference of IEEE vol. 3, Nov. 2-6, 2004 pp. 2560-2565 vol. 3 Digital Object Identifier 10.1109/IECON.2004.1432206.*

The use of unified APC/FD in the control of a metal etch area Hyde, J.; Doxsey, J.; Card, J.; Advanced Semiconductor Manufacturing, 2004. ASMC '04. IEEE Conference and Workshop May 4-6, 2004 pp. 237-240 Digital Object Identifier 10.1109/ASNC.2004. 1309573.*

A Fab-Wide APC Sampling Application Holfeld, A.; Barlovi Âċ, R.; Good, R. P.; Semiconductor Manufacturing, IEEE Transactions on vol. 20, Issue 4, Nov. 2007 pp. 393-399 Digital Object Identifier 10.1109/TSM.2007.907613.*

Real-time control and modelling of plasma etching Sarfaty, M.; Baum, C.; Harper, M.; Hershkowitz, N.; Plasma Science, 1997. IEEE Conference Record—Abstracts., 1997 IEEE International Conference on May 19-22, 1997 p. 118 Digital Object Identifier 10.1109/PLASMA.1997.604358.*

"SEMI Draft Doc. #2783B, Human Interface Standard for Semiconductor Manufacturing," SEMI (Semiconductor Equipment and Materials International), p. 1-14, (1999).

"SEMI E-95-1101, Specification for Human Interface for Semiconductor Manufacturing Equipment," SEMI (Semiconductor Equipment and Materials International), p. 1-15, (Feb. 2000).

"Strategic Cell Controller (SCC) User-Interface Style Guide 1.0," SEMATECH Technology Transfer 92061179A-ENG, 215 pp, (dated Aug. 21, 1992).

* cited by examiner

METHOD FOR DATA PRE-POPULATION

This non-provisional application relies for priority on and claims the benefit of the filing date of U.S. Provisional Application No. 60/474,226, filed May 30, 2003, the contents of which are incorporated herein by reference in their entirety.

FIELD OF THE INVENTION

The present invention is related to the management of data in a semiconductor processing system, and particularly to the method of managing data using data pre-population techniques.

BACKGROUND OF THE INVENTION

Throughout the various stages of plasma processing, such as semiconductor or display manufacturing, etc., critical process parameters may vary significantly. Processing conditions change over time with the slightest changes in critical process parameters creating undesirable results. Small changes can easily occur in the composition or pressure of an etch gas, process chamber, or wafer temperature.

The measuring and monitoring of these process parameters at any given time permits valuable data to be accumulated and analyzed. Process control feedback may be used to adjust the process parameters or determine the viability of certain process materials. However, in many cases, changes of process data reflecting deterioration of processing characteristics cannot be detected by simply referring to the process data displayed. It is difficult to detect early stage abnormalities and characteristic deterioration of a process, and often may be necessary to obtain fault detection and prediction, as well as pattern recognition by an advanced process control (APC). Oftentimes a processing tool is not connected to an APC system and the data on the processing tool is not adequately used.

SUMMARY OF THE INVENTION

Accordingly, it is an object of the present invention to provide a method of operating a process control system comprising: coupling the system to a processing element, wherein the system comprises a computer including operational software, a database coupled to the computer, and a GUI and the processing element comprises at least one of a tool, a processing module, and a sensor; operating the system, wherein the system collects data from the processing element and stores the collected data in the database; determining when a process control malfunction occurs; and performing a data recovery, wherein a second computer is coupled to the processing element, the second computer comprising a database and process control software including a data recovery component.

DETAILED DESCRIPTION OF SEVERAL EMBODIMENTS

Figure 1:
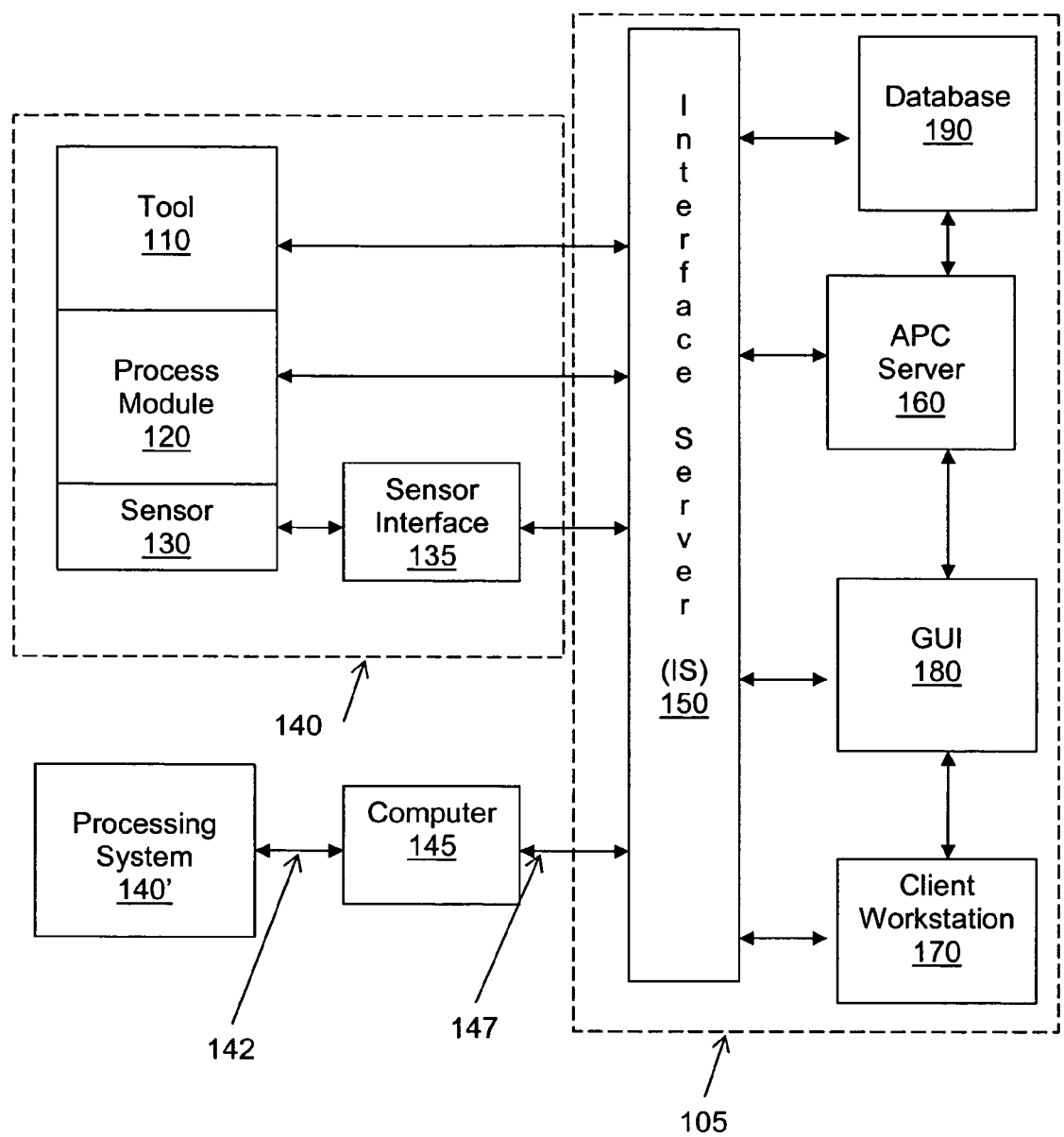
FIG. 1 shows an exemplary block diagram of an APC system in a semiconductor manufacturing environment in accordance with one embodiment of the present invention.

FIG. 1 shows an exemplary block diagram of an APC system in a semiconductor manufacturing environment in accordance with one embodiment of the present invention. In the illustrated embodiment, semiconductor manufacturing environment 100 comprises at least one semiconductor processing tool 110, at least one process module 120, sensor 130, sensor interface 135, and APC system 105. APC system 105 can comprise interface server (IS) 150, APC server 160, client workstation 170, GUI component 180, and database 190. In one embodiment, IS 150 can comprise a real-time memory database that can be viewed as a "Hub".

In the illustrated embodiment, a single tool 110 is shown with a single process module 120, but this is not required for the invention. The APC system 105 can interface with a number of processing tools including cluster tools having one or more process modules. For example, the tools and process modules can be used to perform etching, deposition, diffusion, cleaning, measurement, polishing, developing, transfer, storage, loading, unloading and other semiconductor related processes.

In one embodiment, processing tool 110 can comprise a tool agent (not shown), which can be a software process that runs on a tool 110 and which can provide event information, context information, and start-stop timing commands used to synchronize data acquisition with the tool process. Also, APC system 105 can comprise an agent client (not shown) that can be a software process that can be used to provide a connection to the tool agent.

In one embodiment, IS 150 communicates using sockets. For example, the interface can be implemented using TCP/IP socket communication. Before every communication, a socket is established. Then a message is sent as a string. After the message is sent, the socket is cancelled. Alternately, an interface can be structured as a TCL process extended with C/C++ code, or a C/C++ process that uses a special class, such as a Distributed Message Hub (DMH) client class. In this case, the logic, which collects the process/tool events through the socket connection can be revised to insert the events and their context data into a table in IS 150.

The tool agent can send messages to provide event and context information to the APC system. For example, the tool agent can sent lot start/stop messages, batch start/stop messages, wafer start/stop messages, recipe start/stop messages, and process start/stop messages. In addition, the tool agent can be used to send and/or receive set point data and to send and/or receive maintenance counter data.

When a processing tool comprises internal sensors, this data can be sent to the IS 150 and APC server 160. Data files can be used to transfer this data. For example, some processing tools can create trace files that are compressed in the tool when they are created. Compressed and/or uncompressed files can be transferred. When trace files are created in the processing tool, the trace data may or may not include end point detection (EPD) data. The trace data provides important information about the process. The trace data can be updated and transferred after the processing of a wafer is completed. Trace files are be transferred to the proper directory for each process. In one embodiment, tool trace data, maintenance data, and EPD data can be obtained from a processing tool 110.

In FIG. 1, a single process module is shown, but this is not required for the invention. The semiconductor processing system 100 can comprise any number of processing tools having any number of process modules associated with them and independent process modules. The APC system 105 can collect, provide, process, store, and display data from processes involving processing tools, process modules, and sensors.

Process modules 120 can be identified using data such as ID, module type, gas parameters, and maintenance counters, and this data can be saved into a database. When a new process module is configured, this type of data can be provided using a module configuration screen in GUI component 180. For example, the APC system can support the following module types from Tokyo Electron Limited: a Unity SCCM chamber, a Unity DRM oxide chamber, a Telius DRM oxide chamber, a Telius SCCM oxide chamber, and/or a Telius SCCM Poly chamber. Alternately, the APC system can support other chambers.

In the illustrated embodiment, a single sensor 130 is shown along with an associated process module, but this is not required for the invention. Any number of sensors can be coupled to tools and/or process modules. For example, sensor 130 can comprise an OES sensor, a VIP sensor, an analog sensor, and other types of semiconductor processing sensors including digital probes. The APC system can comprise data management applications that can be used to collect, process, store, display, and output data from a variety of sensors.

In the APC system, sensor data can be provided by both external and internal sources. External sources can be defined using an external data recorder type; a data recorder object can be assigned to each external source; and a state variable representation can be used.

Sensor configuration information combines sensor type and sensor instance parameters. A sensor type is a generic term that corresponds to the function of the sensor. A sensor instance pairs the sensor type to a specific sensor on a specific process module and tool. At least one sensor instance is configured for each physical sensor that is attached to a tool.

For example, an OES sensor can be one type of sensor; a VI probe can be another type of sensor, and an analog sensor can be a different type of sensor. In addition, there can be additional generic types of sensors and additional specific types of sensors. A sensor type includes all of the variables that are needed to set up a particular kind of sensor at run time. These variables can be static (all sensors of this type have the same value), configurable by instance (each instance of the sensor type can have a unique value), or dynamically configurable by a data collection plan (each time the sensor is activated at run time, it can be given a different value).

A "configurable by instance" variable can be the sensor/probe IP address. This address varies by instance (for each process chamber) but does not vary from run to run. A "configurable by data collection plan" variable can be a list of harmonic frequencies. These can be configured differently for each wafer based on the context information. For example, wafer context information can include tool ID, module ID, slot ID, recipe ID, cassette ID, start time and/or end time. There can be many instances of the same sensor type. A sensor instance corresponds to a specific piece of hardware and connects a sensor type to the tool and/or process module (chamber). In other words, a sensor type is generic and a sensor instance is specific.

The APC system 105 can comprise a recorder application that can include a plurality of methods created for starting up, setting up, shutting down, and collecting data from sensor 130. In one case, there can be two recorders used for a probe: one for single frequency mode, and one for a multi frequency mode. A global state variable can be used to keep track of the current state of the recorder, and the states can be idle, ready, and recording.

For example, a recorder application can comprise a start recorder method that can be triggered by a recipe start event. Also, the recorder application can comprise a sensor setup method that can be triggered by a start event such as a wafer-in event. Furthermore, the recorder application can comprise an end recording method that can be called as a result of a wafer-out event.

The APC system 105 can also comprise a data management application for processing the data from sensor 130. For example, a Dynamic Loadable Library (DLL) function, written in C, can be used to parse data from sensor 130 and format it suitable for printing to the output file. The DLL function can take a string from the sensor as a parameter, and return the printable (tab-delimited) string as a second argument.

As shown is FIG. 1, sensor interface 135 can be used to provide an interface between sensor 130 and the APC system 105. For example, APC system 105 can be connected to sensor interface 135 via an internet or intranet connection, and sensor interface 135 can be connected to sensor 130 via an internet or intranet connection. Also, sensor interface 135 can act as a protocol converter, media converter, and data buffer. In addition, sensor interface 135 can provide real-time functions, such as data acquisition, peer-to-peer communications, and I/O scanning. Alternately, sensor interface 135 can be eliminated, and the sensor 130 can be directly coupled to APC system 105.

Sensor 130 can be a static or dynamic sensor. For example, a dynamic VI sensor can have its frequency range, sampling period, scaling, triggering, and/or offset information established at run-time using parameters provided by a data collection plan. Sensor 130 can be an analog sensor that can be static and/or dynamic. For example, analog sensors can be used to provide data for ESC voltage, matcher parameters, gas parameters, flow rates, pressures, temperatures, RF parameters, and/or other process related data. Sensor 130 can comprise at least one of a: VIP probe, OES sensor, analog sensor, digital sensor, and/or a semiconductor processing sensor.

In one embodiment, a sensor interface can write the data points to a raw data file. For example, IS 150 can send a start command to the sensor interface to initiate data acquisition and can send a stop command to cause the file to be closed. IS 150 can then read and parse the sensor data file, process the data and post the data values into the in-memory data tables.

Alternately, the sensor interface could stream the data in real time to the IS 150. A switch could be provided to allow the sensor interface to write the file to disk. The sensor interface can also provide a method to read the file and stream the data points to the IS 150 for off-line processing and analysis.

As shown in FIG. 1, APC system 105 can comprise a database 190. Raw data and trace data from the tool can be stored as files in the database 190. The amount of data depends on the data collection plans configured by the user, as well as the frequency with which processes are performed and processing tools are run. The data obtained from the processing tools, the processing chambers, the sensors, and the APC system is stored in tables.

In one embodiment, the tables can be implemented in the IS 150 as in-memory tables and in database 190 as persistent storage. The IS 150 can use Structured Query Language (SQL) for column and row creation as well as posting data to the tables. The tables can be duplicated in the persistent tables in database 190 (i.e., DB2 can be used) and can be populated using the same SQL statements.

In the illustrated embodiment, IS 150 can be both an in-memory real-time database and a subscription server. For example, client processes are able to perform database functions using SQL with the familiar programming model of relational data tables. In addition, the IS 150 can provide a data subscription service where the client software receives asynchronous notification whenever data that meets their selection criteria is inserted, updated, or deleted. A subscription uses the full power of an SQL select statement to specify which table columns are of interest and what row selection criteria is used to filter future data change notifications.

Because the IS 150 is both a database and a subscription server, clients can open "synchronized" subscriptions to existing table data when they are initialized. The IS 150 provides data synchronization through a publish/subscribe mechanism, in-memory data tables, and supervisory logic for marshalling events and alarms through the system. The IS 150 provides several messaging TCP/IP based technologies including sockets, UDP, and publish/subscribe.

For example, the IS 150 architecture can use multiple data hubs (i.e., SQL databases) that can provide real-time data management and subscription functions. Application modules and user interfaces use SQL messages to access and update information in the data hub(s). Due to performance limitations associated with posting run time data to the relational database, run time data is posted to in-memory data tables managed by the IS 150. The contents of these tables can be posted to the relational database at the end of wafer processing.

In the illustrated embodiment shown in FIG. 1, a single client workstation 170 is shown but this is not required for the invention. The APC system 105 can support a plurality of client workstations 170. In one embodiment, the client workstation 170 allows a user to view status including tool, chamber, and sensor status; to view process status; to view historical data; and to perform modeling and/or charting functions.

The APC system can comprise a database 190 and the APC system, on a daily basis, archives the wafer runs that were processed on the preceding day to a file stored in database 190. The data in the APC database 190 can be used for charting and/or analysis plan execution. For example, this file can include the raw data for each wafer, the summary data for each wafer and each lot, and the tool data and alarm events that are associated with the wafer. The data for all the process runs can be stored in an archive directory in database 190 using a zip file that corresponds to a specific day. These archive files can be copied off the APC server 160 and to a client workstation 170 or another computer using the network or onto portable media.

In the illustrated embodiment shown in FIG. 1, APC system 105 can comprise an APC server 160 that can be coupled to IS 150, client workstation 170, GUI component 180, and database 190, but this is not required for the invention. The APC server 160 can comprise a number of applications including at least one tool-related application, at least one module-related application, at least one sensor-related application, at least one IS-related application, at least one database-related application, and at least one GUI-related application.

The APC server 160 comprises at least one computer and software that supports multiple process tools; collects and synchronizes data from tools, process modules, sensors, and probes; stores data in a database, enables the user to view existing charts; and/or provides fault detection. The APC server allows online system configuration, online lot-to-lot fault detection, online wafer-to-wafer fault detection, online database management, and/or performs multivariate analysis of summary data using models based upon historical data.

For example, APC server 160 can comprise a minimum of 3 GB available disk space; at least 1.2 GHz CPU (Dual processors); a minimum 512 Mb RAM (physical memory); a 120 GB SCSI hard drives in a RAID 5 configuration; a minimum disk cache that is twice the RAM size; Windows 2000 server software installed; Microsoft Internet Explorer; TCP/IP Network protocol; and at least two network cards.

APC system 105 can comprise at least one storage device that stores files containing raw data from sensors and files containing trace data from the tool. If these files are not managed properly (i.e., deleted regularly), the storage device can run out of disk space, and can stop collecting new data. The APC system 105 can comprise a data management application that allow the user to delete older files, thereby freeing disk space so that data collection can continue without interruption. The APC system 105 can comprise a plurality of tables that are used to operate the system, and these tables can be stored in database 190. In addition, other computers (not shown), such as on-site or off-site computers/workstations and/or hosts, can be networked to provide functions such as data/chart viewing, SPC charting, EPD analysis, and/or file access, for one or many tools.

As shown in FIG. 1, the APC system 105 can comprise a GUI component 180. For example, a GUI component can run as an application on the APC server 160, client workstation 170, and tool 110.

GUI component 180 enables an APC system user to perform the desired configuration, data collection, monitoring, modeling, and troubleshooting tasks with as little input as possible. The GUI design can comply with the SEMI Human Interface Standard for Semiconductor Manufacturing Equipment (SEMI Draft Doc. #2783B) and with the SEMATECH Strategic Cell Controller (SCC) User-Interface Style Guide 1.0 (Technology Transfer 92061179A-ENG). Those skilled in the art will recognize that GUI screens can comprise a left-to-right selection tab structure and/or a right-to-left structure, a bottom-to-top structure, a top-to-bottom structure, or a combination structure. Alternatively, the GUI design can comply with MicroSoft GUI Standards (MicroSoft Corporation, Redmond, Wash.)

GUI component 180 provides a means of interaction between the APC system 105 and the user. When the GUI begins, a logon screen that validates the user identification and password can be displayed and that provides a first level of security. Desirably, users can be registered using a security application before logging on. A database check of user identification indicates an authorization level, which will streamline the GUI functions available. Selection items for which the user is not authorized can be displayed differently or be unavailable. The security system also allows a user to change an existing password. For example, the logon screen can be opened from a browser tool such as Netscape or Internet Explorer. A user can enter a user ID and password in the logon fields.

One or more GUI screens can include a title panel located along the top of the screen, an information panel to display user information, and a control panel at the bottom of the screen. The GUI can create and view plots of summary data and trace data, and display web screens showing the status based on the last wafer and in real-time, view alarm logs, and/or configure the system.

GUI component 180 provides easy to use interfaces that enable users to: view tool status and process module status; create and edit x-y charts of summary and raw (trace) parametric data for selected wafers; view tool alarm logs; configure data collection plans that specify conditions for writing data to the database or to output files; input files to statistical process control (SPC) charting, modeling and spreadsheet programs; generate Wafer Reports, which detail processing information for specific wafers, and Database Save Reports, which detail what data is currently being saved to the database; create and edit SPC charts of process parameters, and set SPC alarms which generate email warnings; run multivariate Principal Components Analysis (PCA) models for fault detection; and/or view diagnostics screens in order to troubleshoot and report problems with the APC Controller.

In addition, authorized users and administrators can use GUI screens to modify system configuration and sensor setup parameters. With an offline workstation, GUI component 180 provides users with user-friendly screens for developing multivariate PCA models for fault detection.

The GUI component 180 can comprise a configuration component for allowing a user to configure processing tools, processing modules, sensors, and/or the APC system. For example, GUI configuration screens can be provided for at least one of a processing tool, a processing module, a sensor, a sensor instance, a module pause, and an alarm. Configuration data can be stored in an attribute database table and can be setup with the defaults at the installation.

The GUI component 180 can comprise a status component for displaying the current status for processing tools, processing modules, sensors, and/or the APC system. In addition, the status component can comprise a charting component for presenting system-related and process-related data to a user using one or more different types of charts.

The GUI component can comprise a data manager component for creating, editing, and/or viewing strategies and plans used to collect, store, and analyze data.

Also, GUI component 180 can comprise a realtime operational component. For example, a GUI component can be coupled to a background task, and shared system logic can provide the common functionality used both by the background task and by the GUI component. Shared logic can be used to guarantee that the returned values to the GUI component are the same as the ones returned to the background task. Furthermore, the GUI component 180 can comprise an APC file management GUI component and a security component.

Processing element 140' and computer 145 are also shown in FIG. 1. Processing element 140' can comprise at least one of: a processing tool, process module, sensor, and other data generator. Computer 145 can comprise a portable computer comprising data management applications and GUI applications. Computer 145 can be coupled to processing element 140' using a bi-directional interface 142.

In one case, processing element 140' can be a processing tool whose historical data a user wants to recover. For example, a user can transfer and/or copy the historical data to a database on the computer 145, whereby the data previously acquired on the tool is recovered.

When computer 145 cannot be connected to the APC system 105, computer 145 can serve as a data storage device. For example, computer 145 can be a portable unit having a least one memory device, and computer 145 can comprise operational software, such as the Ingenio software, from Tokyo Electron. In one case, the operational software comprises at least one of: a configuration means, a data management means, a GUI means, a fault management means, and a trouble-shooting means. Also, configuration GUI screens can be used to configure the interface between the computer and the processing element, to determine the device type for the processing element (i.e., tool, module, sensor, etc.), and data management GUI screens can be used to determine the amount and type of data to collect, and to determine how to and where to store the collected data. Furthermore, fault management GUI screens can be used to inform a user about fault conditions. Alternately, the computer can be coupled to the APC system at a later time to transfer the collected data to the APC system.

When computer 145 can be coupled to the processing element and the APC system 105, computer 145 can serve as a data translation device and transfer the historical data from the processing element 140' to the APC system 105. For example, computer 145 can be a portable unit having a least one memory device, and computer 145 can comprise operational software, such as the Ingenio software, from Tokyo Electron, and the operational software can comprise at least one of: a configuration means, a data management means, a GUI means, a fault management means, and a trouble-shooting means.

In one case, configuration GUI screens can be used to configure the interface between the computer and the processing element, to configure the interface between the computer and the APC system, and to determine the device type for the processing element (i.e., tool, module, sensor, etc.). Also, data manager GUI screens can be used to determine the amount and type of data to collect, and to determine how to and where to store the collected data. Furthermore, fault management GUI screens can be used to inform a user about fault conditions. Alternately, the computer can store the collected data and transfer the collected data to the APC system at a later time.

In addition, a user can review the collected data to troubleshoot the processing element. For example, the computer and the associated software can be used as a portable diagnostic tool for troubleshooting production problems related to processing tools, process modules, and sensors. The accumulated data can be used to compare operation of two or more processing elements as well as investigating the operation of a single processing element over time.

When the processing element is a cluster tool from Tokyo Electron, the computer and the associated software, can provide the capability to read trace and process files from a connected tool and pre-populate one or more databases. For example, the computer can be coupled to the cluster tool and can pre-populate a database associated with the computer with the historical data including trace and process files before collecting any additional data. Also, the computer can be coupled to the cluster tool and can pre-populate a database associated with the computer with the historical data including trace and process files before allowing the processing element to collect any additional data. In addition, the computer can be coupled to a database associated with the processing element. The process runs thus pre-populated in the database appear as though they had been collected directly by the APC system software associated with the computer. In addition, the tool data pre-populated in the database appears as though the tool data had been directly collected by the APC system software associated with the computer. In this manner, the computer and the associated software can be used acquire and combine data from multiple tools.

One method for performing a data recovery can comprise coupling a computer to an existing processing element. For example, the processing element can be a cluster tool from Tokyo Electron, and the computer can comprise operational software from Tokyo Electron that includes a "pre-populate" function. When a user selects the "pre-populate" function, the data from the cluster tool is recovered, and the user can specify the period of time to use in the recovery process. The historical data, information in the trace and process files, is transferred to at least one database and is available for charting and SPC analysis. During the pre-population operation, an auto configuration function can be enabled, and enabling this function allows the pre-population of SPC charts for the eligible parameters. A user can view each SPC chart and establish manual limits for notifications and interventions.

A method for performing a trouble-shooting function can comprise coupling a computer to a malfunctioning processing element. For example, the processing element can be a cluster tool from Tokyo Electron, and the computer can comprise operational software from Tokyo Electron that includes a "pre-populate" function. When a user selects the "pre-populate" function, the data from the cluster tool is recovered, and the user can specify the period of time to use in the recovery process. The historical data, information in the trace and process files, is transferred to at least one database and is available for charting and troubleshooting. A user can compare historical trace files with more recent trace file to determine when a change in the operation of the tool occurred.

Another method for performing a data recovery can comprise coupling a server to a number of existing processing elements. For example, the processing elements can be cluster tools from Tokyo Electron, and the server can comprise operational software from Tokyo Electron that includes a "pre-populate" function. When a user selects a particular tool and selects the "pre-populate" function, the data from this particular tool can be recovered. In addition, a user can specify the period of time to use in the recovery process. The historical data for each tool can be transferred to at least one database and can be made available for charting and SPC analysis. During the pre-population operation, an auto configuration function can be enabled, and enabling this function allows the pre-population of SPC charts for the eligible parameters for a particular tool. A user can view each SPC chart and establish manual limits for notifications and interventions. The data can be used to compare the operation of different tools as well as the operation of a single tool over time.

A method for performing a backup function can comprise coupling a computer to a processing element having limited storage capacity. For example, the processing element can be a cluster tool from Tokyo Electron, and the tool can have limited storage capability for historical log files on its internal hard drive. A user can archive the tool data periodically so that it will not be lost due to storage limitations, and this can be done during maintenance operations. The computer can be a portable unit and can include operational software from Tokyo Electron that includes a "pre-populate" function. When a user selects the "pre-populate" function, the data from the cluster tool is recovered, and the user can specify the period of time to use in the recovery process. The historical data is transferred to at least one database and archival files can be created that can be used to backup the tool data as well as providing archival storage.

A data recovery procedure can be performed after an APC system malfunction has occurred, and data has not been stored in the APC database for a certain amount of time. In one case, the APC system malfunction can comprise a disconnect problem, where the APC system is temporally disconnected from a tool, processing module, and/or sensor. For example, an APC system, such as an APC system from Tokyo Electron, and the tool can be a cluster tool, such as one from Tokyo Electron. If the APC system becomes disconnected from the tool for a period of time, the tool continues to process wafers normally and store data in files on the tool's hard drive. However, because the APC system is not connected, no data is stored in the APC database. If the APC system can be reconnected after a short period of time, the APC system can perform a data recovery procedure where the data stored on the tool's hard drive is examined and the missing data is transferred to the APC database. If the APC system cannot be reconnected after a short period of time, a computer can be connected to the tool using at least one of: a hard wire connection, an intranet connection, and an internet connection. The computer can be a portable unit having an internal storage device and can include operational software from Tokyo Electron that includes a "pre-populate" function. When a user selects the "pre-populate" function, the data from the cluster tool is recovered, and the user can specify the period of time to use in the recovery process. The recovered data can be transferred to the internal storage device and archival files can be created that can be used to backup the tool data as well as provide long term storage.

In another example, the processing element can be an integrated metrology (IM) module, and the IM module can have limited storage capability for historical log files on its internal hard drive. A user can archive the metrology data periodically so that it will not be lost due to storage limitations, and this can be done during maintenance operations. The computer can be a portable unit and can include operational software from Tokyo Electron that includes a "pre-populate" function. When a user selects the "pre-populate" function, the data from the IM module is recovered, and the user can specify the period of time to use in the recovery process. The historical data is transferred to at least one database and archival files can be created that can be used to backup the tool data as well as provide long term storage.

In addition, the processing element can be a sensor, and the sensor can have limited storage capability for historical log files on its internal hard drive. A user can archive the sensor data periodically so that it will not be lost due to storage limitations, and this can be done during maintenance operations. The computer can be a portable unit and can include operational software from Tokyo Electron that includes a "pre-populate" function. When a user selects the "pre-populate" function, the data from the sensor can be recovered, and the user can specify the period of time to use in the recovery process. The historical data is transferred to at least one database and archival files can be created that can be used to backup the tool data as well as provide long term storage.

The "pre-populate" function solves the "missing data" problem and can be used to fill in gaps in the historical record.

Figure 2:
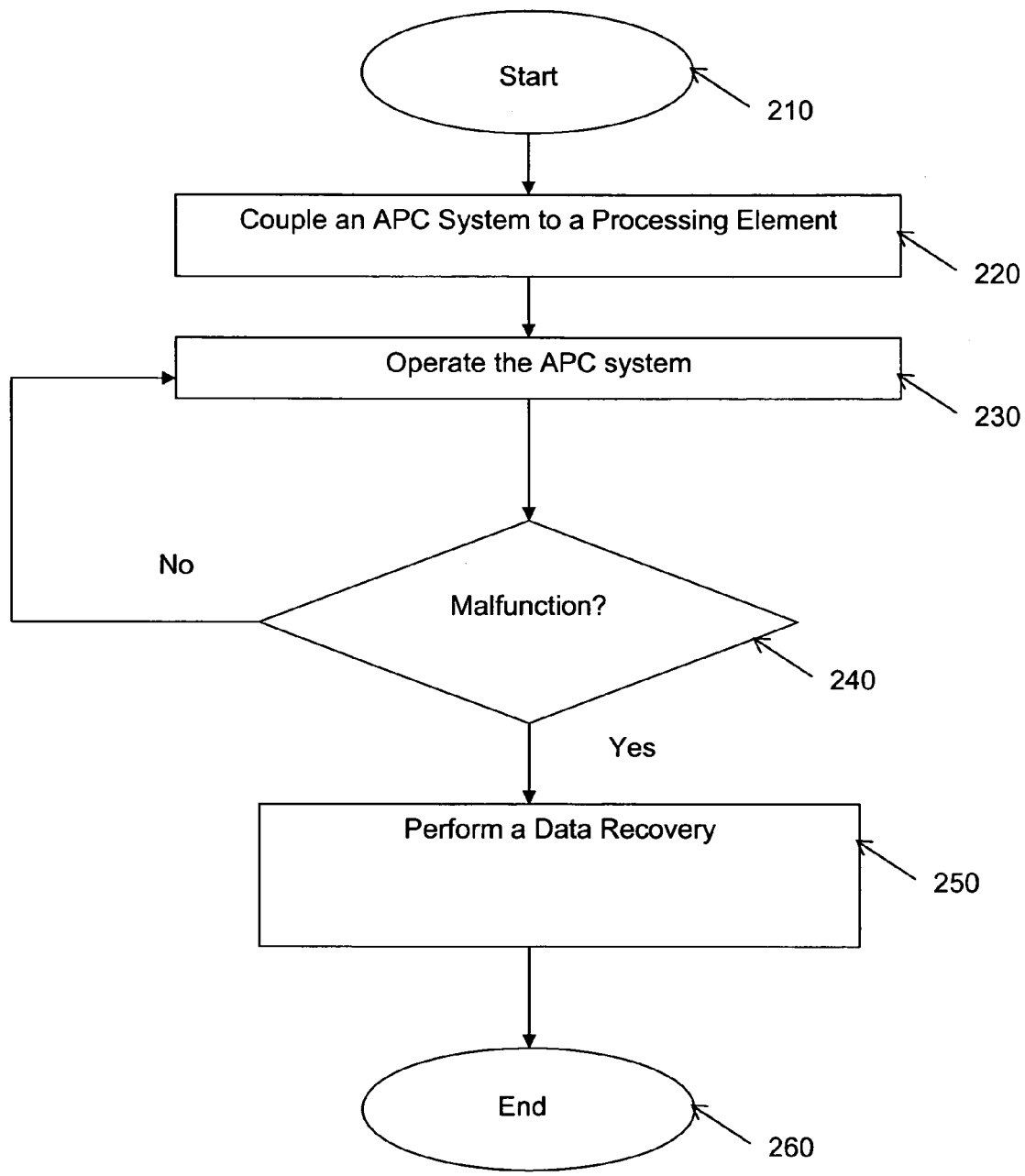
FIG. 2 illustrates a flow for a method of operating an APC system in accordance with an embodiment of the present invention.

FIG. 2 illustrates a flow for a method of operating an APC system in accordance with an embodiment of the present invention. Procedure 200 starts in 210. In 220, the APC system can be coupled to at least one processing element that can comprise at least one of a tool, a processing module, and a sensor. For example, the APC system can be an APC system from Tokyo Electron, and the processing element can include a cluster tool, such as one from Tokyo Electron. Also, the APC system can comprise an APC computer including operational software, a database coupled to the APC computer, and a GUI.

In 230, the APC system can operate, wherein the APC system collects data from the processing element and stores the collected data in the database. For example, a data collection plan can be created and executed.

In 240, a query is performed to determine if an APC malfunction occurs. If a malfunction has not occurred, the procedure 200 branches to 230. If a malfunction has occurred, procedure 200 continues to 250.

In 250, a data recovery process is performed. Data recovery can be performed using a number of different processes. For example, a second computer can be coupled to the processing system that was connected to the APC system when the malfunction occurred. The second computer can comprise operational software that includes a data recovery component that is activated when the second computer is coupled to the processing system. The data recovery component can comprise a "pre-populate" function that examines the historical data stored on the processing system and transfers at least a portion of the historical data to a database coupled to the second computer.

In one case, the computer can be a portable unit and can include operational software from Tokyo Electron that includes a "pre-populate" function. The processing system can include a cluster tool, such as one from Tokyo Electron and the computer can be coupled to the tool using a hardwire connection. When a user selects the "pre-populate" function, the data from the cluster tool is recovered, and the user can specify the period of time to use in the recovery process. The historical data is transferred to at least one database and archival files can be created that can be used to backup the tool data as well as provide long-term storage.

In another case, the computer can be a second APC computer and can include operational software from Tokyo Electron that includes a "pre-populate" function. The processing system can include a cluster tool, such as one from Tokyo Electron and the second APC computer can be coupled to the tool using an ethernet connection. When a user selects the "pre-populate" function, the data from the cluster tool is recovered, and the user can specify the period of time to use in the recovery process. The historical data is transferred to at least one database and archival files can be created that can be used to backup the tool data as well as provide long-term storage.

Figure 3:
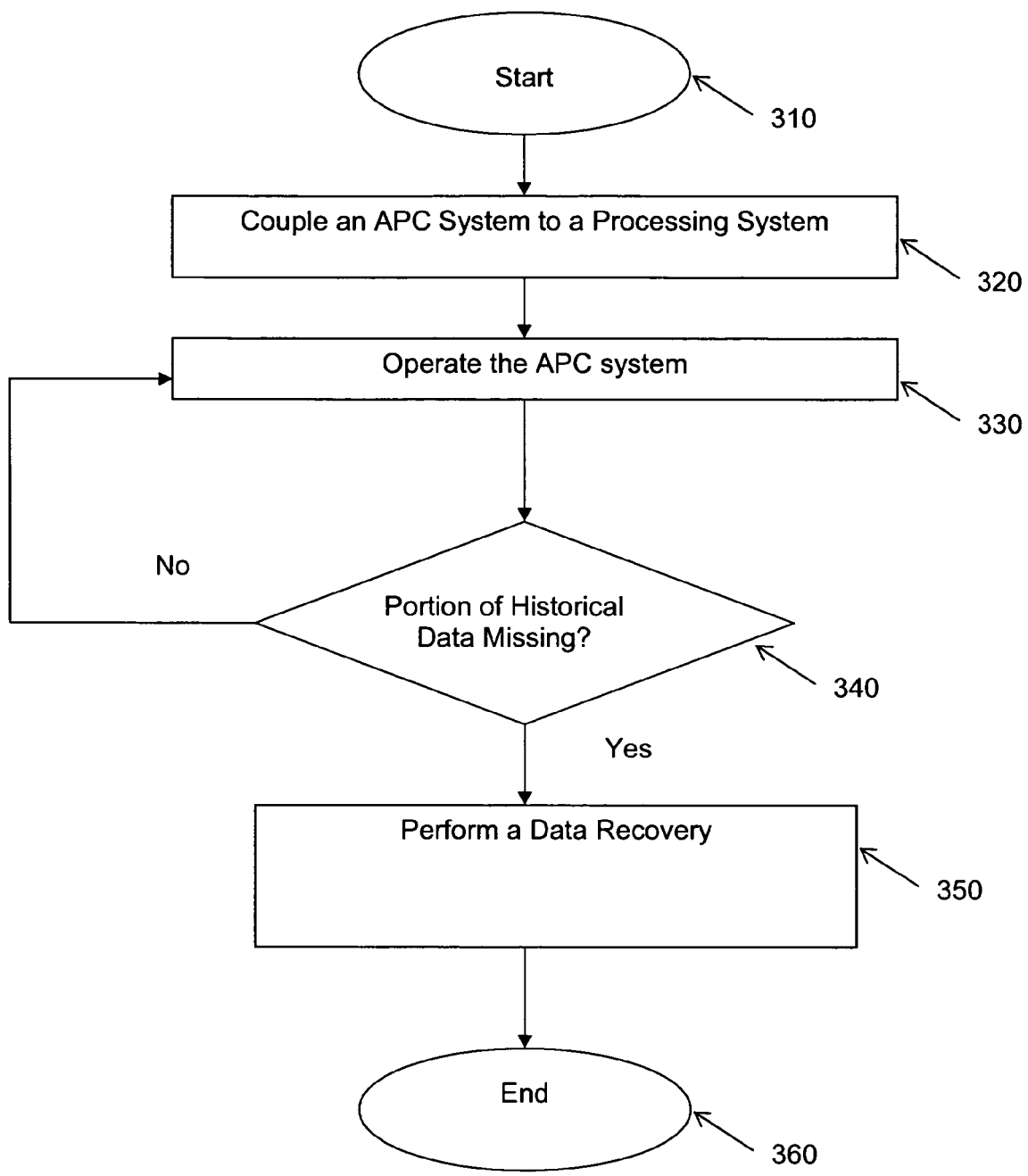
FIG. 3 illustrates a flow for another method of operating an APC system in accordance with an embodiment of the present invention.

FIG. 3 illustrates a flow for another method of operating an APC system in accordance with an embodiment of the present invention. Procedure 300 starts in 310. In 320, the APC system can be coupled to at least one processing system that can comprise at least one of a tool, a processing module, and a sensor. For example, the APC system can be an APC system from Tokyo Electron, and the processing system can include a cluster tool, such as one from Tokyo Electron. Also, the APC system can comprise an APC computer including operational software, a database coupled to the APC computer, and a GUI.

In 330, the APC system can operate, wherein the APC system collects data from the processing system and stores the collected data in the database. For example, a data collection plan can be created and executed.

In 340, a query is performed to determine if a portion of the historical data is missing from the database. If the historical data is complete, procedure 300 branches to 330. If a portion of the historical data is missing from the database, procedure 300 continues to 350.

In 350, a data recovery process is performed. Data recovery can be performed using a number of different processes. For example, an APC computer/system can be coupled to the processing system that was disconnected from an APC system for a period of time. The APC computer/system can comprise operational software that includes a data recovery component that is activated when the APC computer/system is coupled to the processing system. The data recovery component can comprise a "pre-populate" function that examines the historical data stored on the processing system and transfers at least a portion of the historical data to a database coupled to the APC computer.

In one case, the computer can be a portable unit and can include operational software from Tokyo Electron that includes a "pre-populate" function. The processing system can include a cluster tool, such as one from Tokyo Electron and the computer can be coupled to the tool using a hardwire connection. When a user selects the "pre-populate" function, the data from the cluster tool is recovered, and the user can specify the period of time to use in the recovery process. The historical data is transferred to at least one database and archival files can be created that can be used to backup the tool data as well as provide long-term storage.

In another case, the computer can be a APC computer on a network and can include operational software from Tokyo Electron that includes a "pre-populate" function. The processing system can include a cluster tool, such as one from Tokyo Electron and the second APC computer can be coupled to the tool using an ethernet connection. When a user selects the "pre-populate" function, the data from the cluster tool is recovered, and the user can specify the period of time to use in the recovery process. The historical data is transferred to at least one database and archival files can be created that can be used to backup the tool data as well as provide long-term storage.

Figure 4:
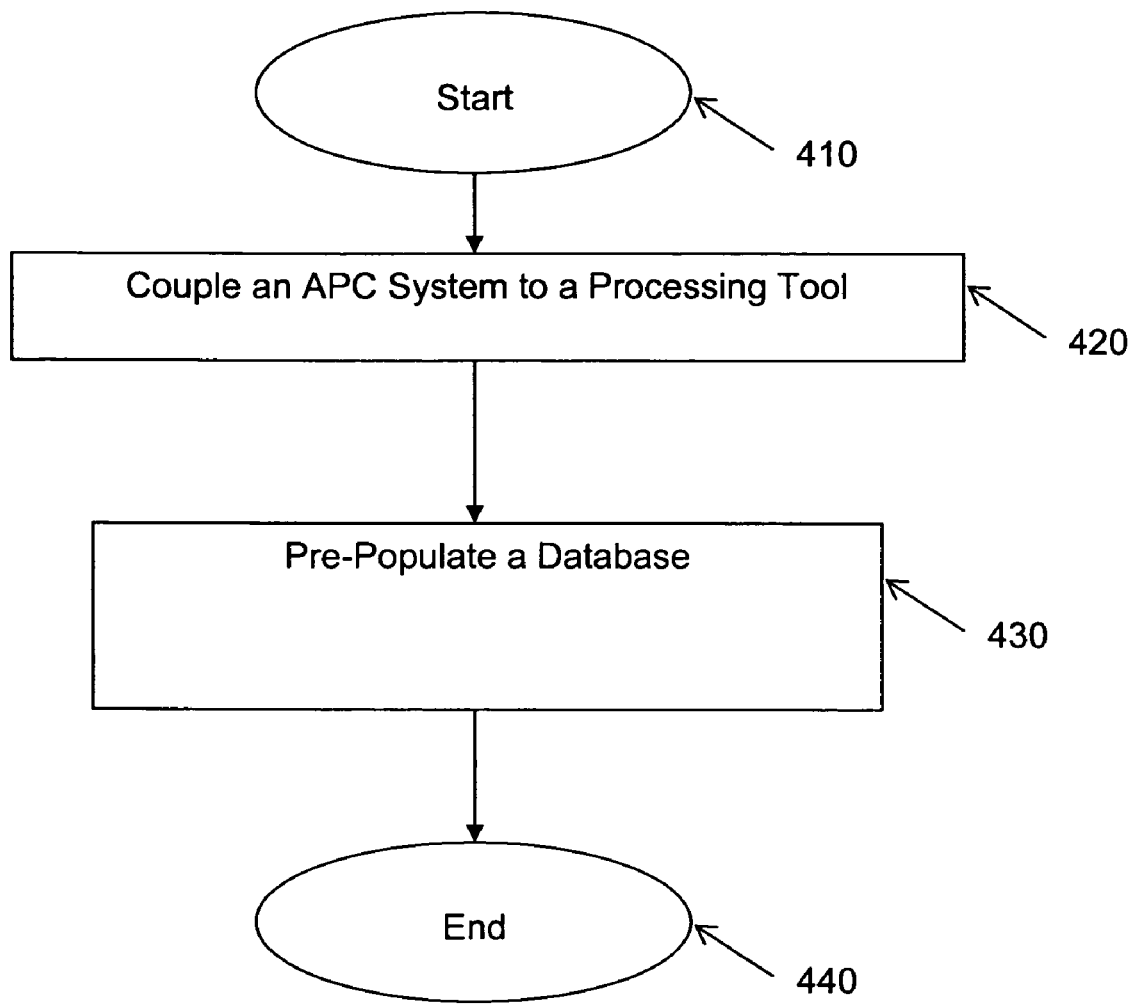
FIG. 4 illustrates a flow for an additional method of operating an APC system in accordance with an embodiment of the present invention.

FIG. 4 illustrates a flow for another method of operating an APC system in accordance with an embodiment of the present invention. Procedure 400 starts in 410. In 420, the APC system can be coupled to at least one processing tool that can be a cluster tool that comprises at least one of processing module, and at least one sensor. For example, the APC system can be an APC system from Tokyo Electron, and the processing tool can include a cluster tool, such as one from Tokyo Electron. Also, the APC system can comprise an APC computer including operational software, a database coupled to the APC computer, and a GUI.

In 430, the APC system can operate, and the database is pre-populated with historical data from the processing tool. For example, the APC system can execute a data collection plan that includes a pre-population function. During execution of the data collection plan, the APC system can collect historical data from the processing tool and stores the collected data in the database.

Data pre-population can be performed using a number of different processes. For example, an APC computer/system can be coupled to the processing tool that was previously not connected to an APC system. The APC computer/system can comprise operational software that includes a data pre-population component that is activated when the APC computer/system is coupled to the processing tool. The pre-populate function examines the historical data stored on the processing tool and transfers at least a portion of the historical data to a database coupled to the APC computer.

In one case, the computer can be a portable unit and can include operational software from Tokyo Electron that includes a "pre-populate" function. The processing tool can include a cluster tool, such as one from Tokyo Electron and the computer can be coupled to the tool using a hardwire connection. When a user selects the "pre-populate" function, the data from the cluster tool is recovered, and the user can specify the period of time to use in the recovery process. The historical data is transferred to at least one database and archival files can be created that can be used to backup the tool data as well as provide long-term storage.

In another case, the computer can be a APC computer on a network and can include operational software from Tokyo Electron that includes a "pre-populate" function. The processing tool can include a cluster tool, such as one from Tokyo Electron and the second APC computer can be coupled to the tool using an ethernet connection. When a user selects the "pre-populate" function, the data from the cluster tool is recovered, and the user can specify the period of time to use in the recovery process. The historical data is transferred to at least one database and archival files can be created that can be used to backup the tool data as well as provide long-term storage.

When the computer and the processing element are networked and have internet addresses, the computer can be coupled to the processing element using internet protocols. Alternately, intranet protocols can be used. In other cases, the computer can be coupled to the processing tool using optical fibers or other hard-wire means.

When an APC system is coupled to a processing element, a configuration procedure can be performed in which the processing element is identified. For example, when the processing element is a cluster tool, the processing modules and sensors coupled to the cluster tool are identified. The configuration procedure can be part of a data collection plan that is executed by the APC system.

The data pre-population function can be context based. The context data can include configuration information and user supplied information. For example, user supplied information can be determined using a Graphical User Interface (GUI). When the data pre-population function is time-based, a data recovery plan can be established to recover the historical data from a first time to a second time. In one case, the times can be automatically determined by the APC system, and in another case a user can determine the times using a GUI screen.

Also, the context data can include software version information. In this case, the APC system determines the period in time for which the processing element was coupled to a different computer operating with an earlier version of the APC software, and the APC system pre-populates the database with the historical data that was obtained using the earlier version of the APC software. In addition, context data can include wafer information. For example, when the data pre-population function is wafer-based, a data recovery plan can be established to recover the historical data for a number of wafers.

Numerous modifications and variations of the present invention are possible in light of the above teachings. It is therefore to be understood that, within the scope of the appended claims, the invention may be practiced otherwise than as specifically described herein.

What is claimed is:

1. A method of operating a process control system comprising:
coupling the system to a processing element, wherein the system comprises an Advanced Process Control (APC) computer including operational software, a database coupled to the APC computer, and a graphical user interface (GUI) and the processing element comprises at least one of a tool, a processing module, and a sensor;
operating the system, wherein the system collects data from the processing element and stores the collected data in the database;
determining when a process control malfunction occurs, the process control malfunction comprising at least an interruption in storage of the collected data in the database; and
performing a data recovery, wherein a second computer is coupled to the processing element, the second computer comprising a database and process control software including a data recovery component, the data recovery comprising recovery of at least a portion of collected data during the interruption.

2. The method as claimed in claim 1, wherein the second computer is coupled to the processing element using internet protocols, wherein the second APC computer and the processing element have internet addresses.

3. The method as claimed in claim 2, wherein the second computer comprises a portable computer.

4. The method as claimed in claim 1, wherein the data recovery component comprises a pre-populate function, wherein the second computer database is pre-populated with at least a portion of the historical data stored by the processing element.

5. The method as claimed in claim 4, wherein the data recovery component is configured to pre-populate the second computer database with the historical data from a first time to a second time.

6. The method as claimed in claim 5, wherein the first time is determined using the oldest historical data and the second time is determined using the newest historical data.

7. The method as claimed in claim 4, wherein the processing element comprises historical data obtained during a disconnect period, the disconnect period comprising a period in time in which the processing element was not connected to the APC system.

8. The method as claimed in claim 4, wherein the processing element comprises historical data obtained during an update period, the update period comprising a period in time in which the processing element was coupled to a computer operating with an earlier version of the APC software, wherein the historical data comprises data obtained using the earlier version of the APC software.

9. The method as claimed in claim 4, wherein the processing element comprises historical data obtained during a backup period, the backup period comprising a period in time in which the processing element was not connected to a permanent database.

10. The method as claimed in claim 4, wherein the data recovery component is configured to pre-populate the second computer database with the historical data for at least one wafer.

11. The method as claimed in claim 4, wherein the data recovery component is configured to pre-populate the second computer database with the historical data for at least one wafer lot.

12. The method as claimed in claim 1, wherein the data recovery component is context-based.

13. The method as claimed in claim 1, wherein the data recovery component is part of a data collection plan.

14. A method of operating an Advanced Process Control (APC) system comprising:
coupling the APC system to a processing system, wherein the APC system comprises an APC computer including operational software, a database coupled to the APC computer, and a graphical user interface (GUI), and wherein the processing system comprises at least one of a tool, a processing module, and a sensor;
operating the APC system, wherein the APC system is configured to collect historical data from the processing system and to store the historical data in the database;
determining if a portion of the historical data is not stored in the database; and
performing a data pre-population function when a portion of the historical data is not stored in the database, the data pre-population of at least a portion of the historical information not stored in the database.

15. The method as claimed in claim 14, wherein the method further comprises coupling a second APC computer to the processing system, the second APC computer comprising a database and APC software including a data pre-population component.

16. The method as claimed in claim 15, wherein the second APC computer is coupled to the processing element using internet protocols, wherein the computer and the processing element have internet addresses.

17. The method as claimed in claim 15, wherein the second APC computer comprises a portable computer.

18. The method as claimed in claim 14, wherein the portion of the historical data is determined using a first time and a second time.

19. The method as claimed in claim 18, wherein the first time is determined using the oldest historical data and the second time is determined using the newest historical data.

20. The method as claimed in claim 14, wherein the portion of the historical data comprises historical data stored by the processing system during a disconnect period, the disconnect period comprising a period in time in which the processing system was not connected to the APC system.

21. The method as claimed in claim 14, wherein the portion of the historical data comprises historical data stored by the processing system during an update period, the update period comprising a period in time in which the processing system was coupled to a computer operating with an earlier version of the APC software, wherein the historical data comprises data obtained using the earlier version of the APC software.

22. The method as claimed in claim 14, wherein the portion of the historical data comprises historical data stored by the processing system for at least one wafer.

23. The method as claimed in claim 14, wherein the portion of the historical data comprises historical data stored by the processing system for at least one wafer lot.

24. A method of operating an Advanced Process Control (APC) system comprising:

coupling the APC system to a processing tool, wherein the APC system comprises an APC computer including operational software, a database coupled to the APC computer, and a graphical user interface (GUI), and wherein the processing tool comprises at least one of a processing module and a sensor; and pre-populating a database with historical data from the processing tool, wherein the APC system is configured to determine if a portion of the historical data is not in the database and to store that portion of the historical data in the database.

25. The method as claimed in claim 24, wherein the method further comprises coupling a second APC computer to the processing tool, the second APC computer comprising the database and APC software including a data pre-population component.

26. The method as claimed in claim 25, wherein the second APC computer is coupled to the processing element using internet protocols, wherein the computer and the processing element have internet addresses.

27. The method as claimed in claim 25, wherein the second APC computer comprises a portable computer.

28. The method as claimed in claim 24, wherein the portion of the historical data is determined using a first time and a second time.

29. The method as claimed in claim 28, wherein the first time is determined using the oldest historical data and the second time is determined using the newest historical data.

30. The method as claimed in claim 24, wherein the portion of the historical data comprises historical data stored by the processing tool during a disconnect period, the disconnect period comprising a period in time in which the processing tool was not connected to the APC system.

31. The method as claimed in claim 24, wherein the portion of the historical data comprises historical data stored by the processing system during an update period, the update period comprising a period in time in which the processing tool was coupled to a computer operating with an earlier version of the APC software, wherein the historical data comprises data obtained using the earlier version of the APC software.

32. The method as claimed in claim 24, wherein the portion of the historical data comprises historical data stored by the processing system for at least one wafer.

33. The method as claimed in claim 24, wherein the portion of the historical data comprises historical data stored by the processing system for at least one wafer lot.

* * * * *